March 31, 1970  A. W. KAMMERER, JR  3,503,213
METHOD OF AND APPARATUS FOR INSTALLING REINFORCING
MEMBERS IN BOREHOLES
Filed Aug. 14, 1967  5 Sheets-Sheet 1

INVENTOR.
ARCHER W. KAMMERER, JR.
BY Bernard Kriegel
ATTORNEY

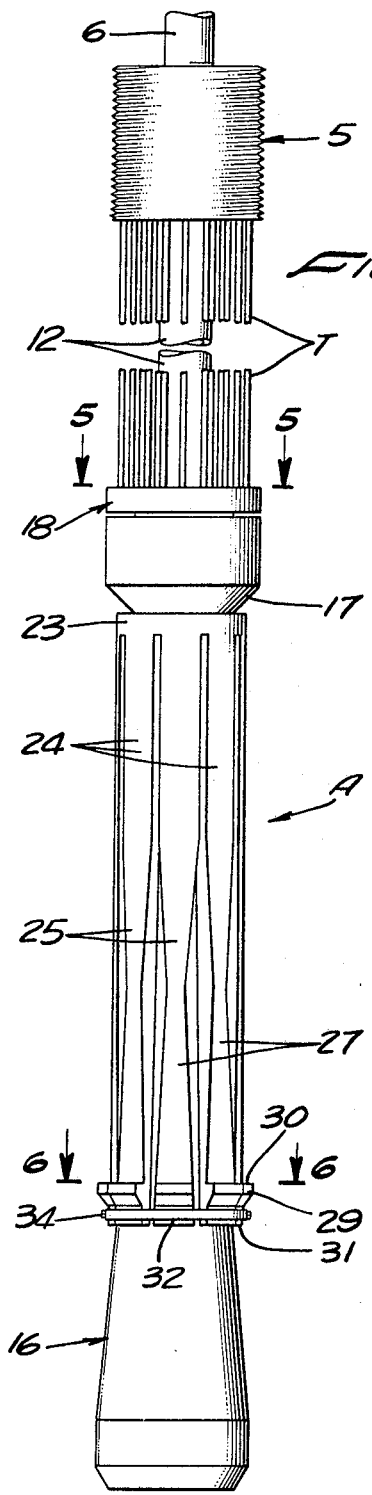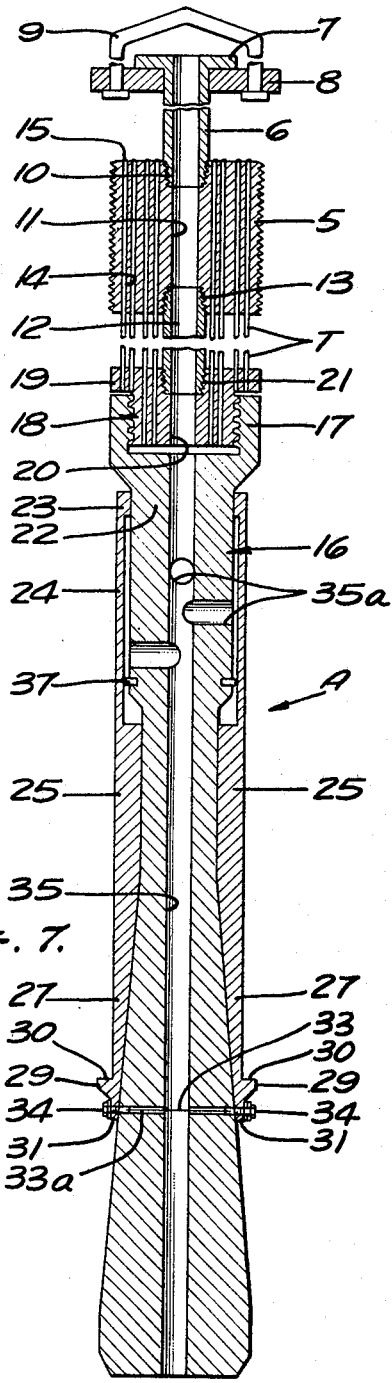

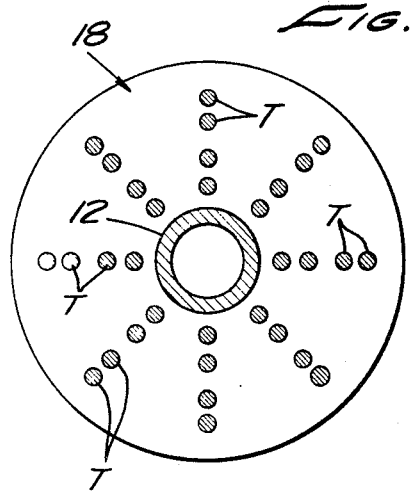
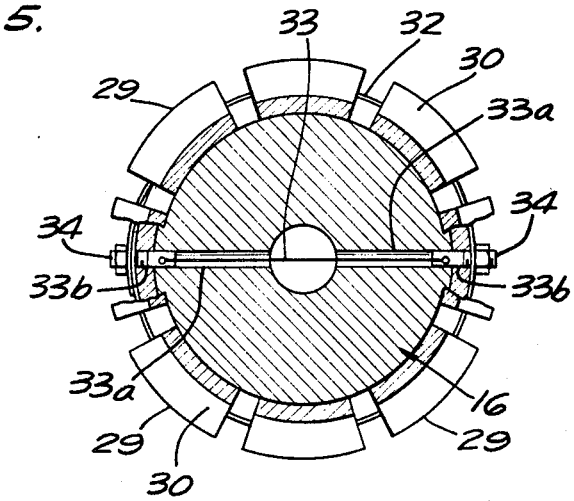
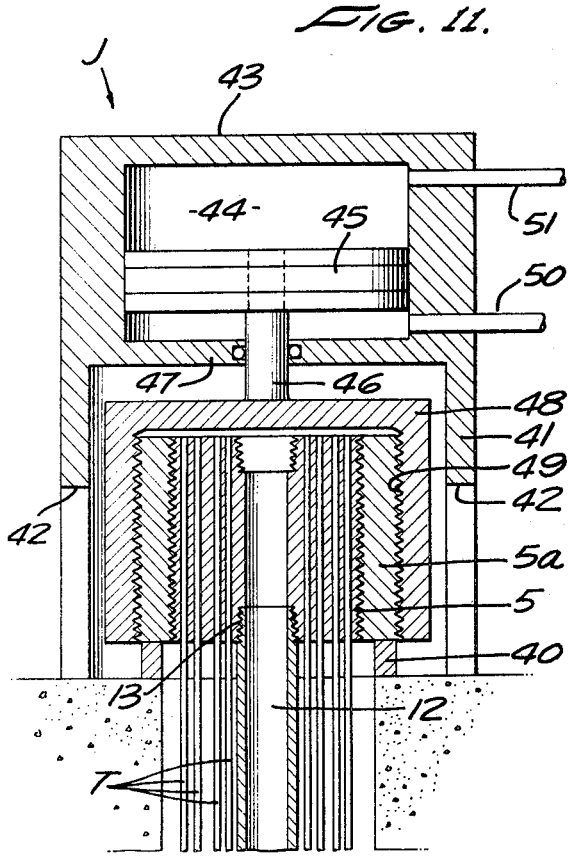
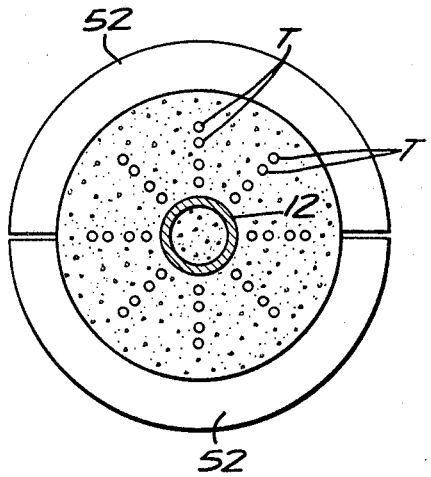

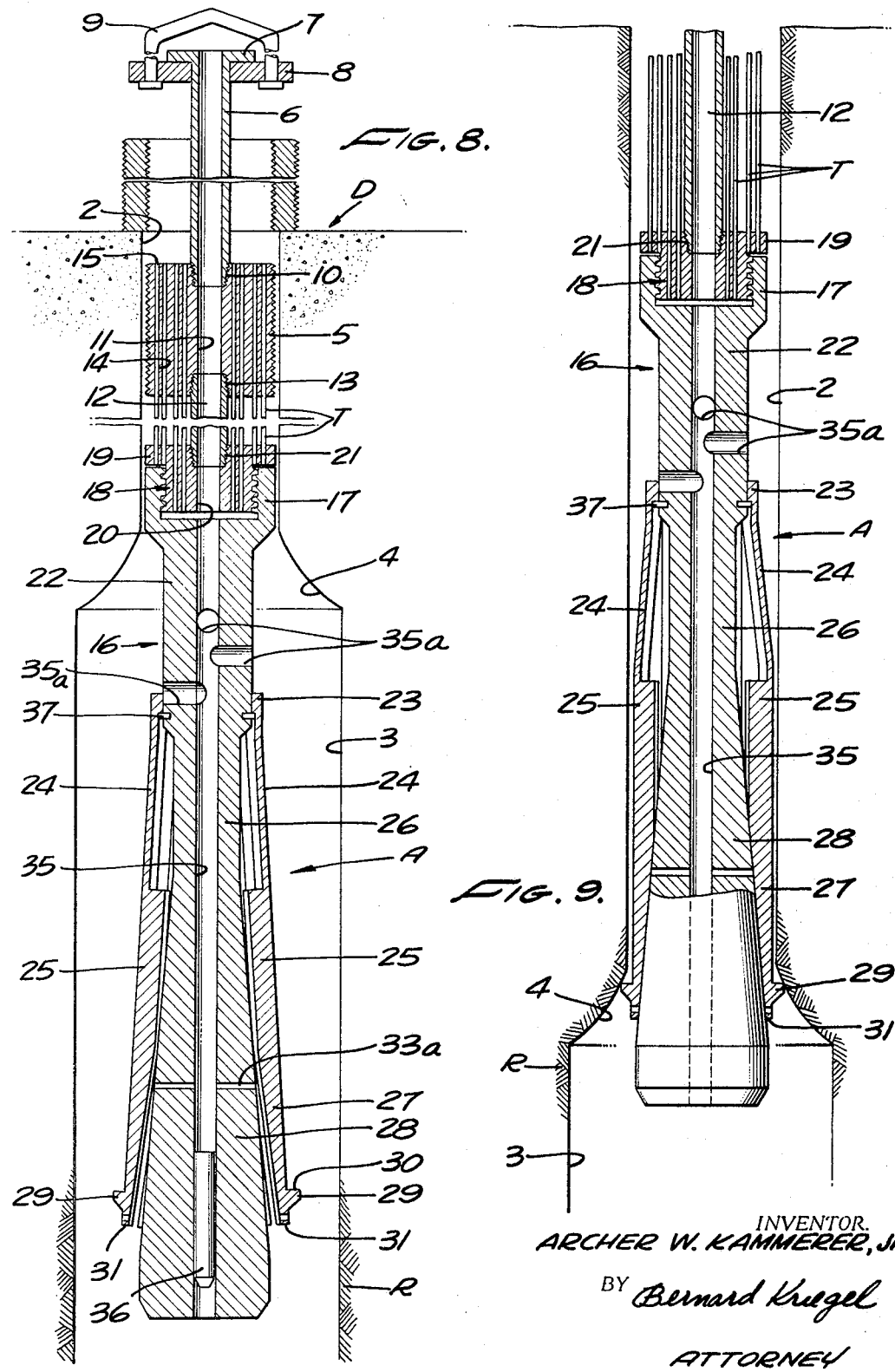

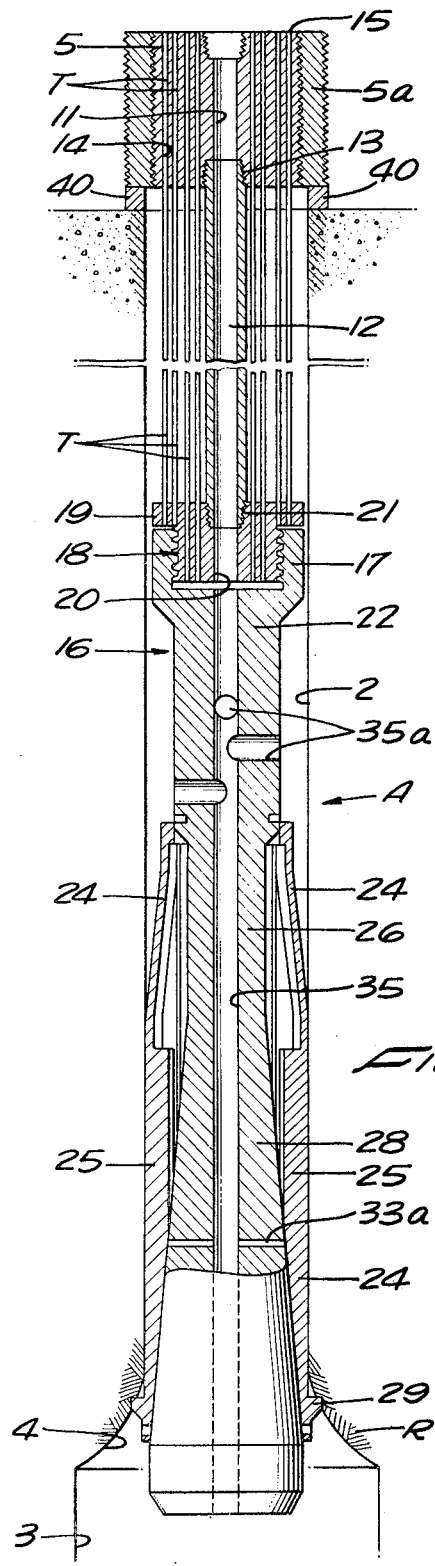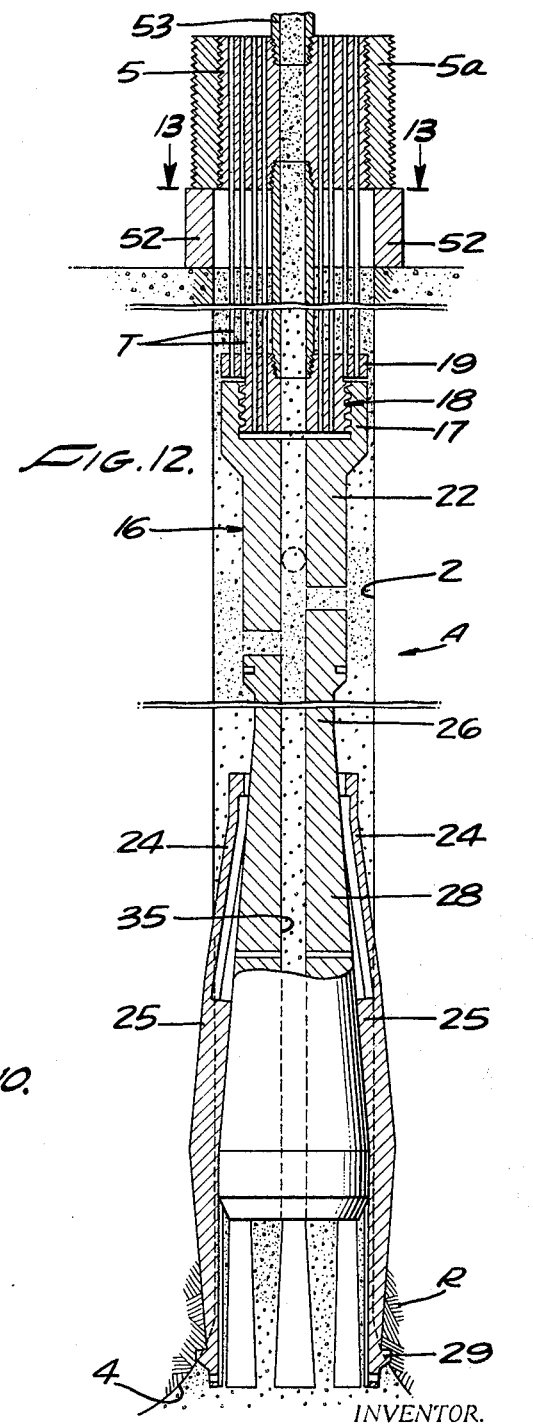

United States Patent Office 3,503,213
Patented Mar. 31, 1970

3,503,213
METHOD OF AND APPARATUS FOR INSTALLING REINFORCING MEMBERS IN BOREHOLES
Archer W. Kammerer, Jr., Fullerton, Calif., assignor, by direct and mesne assignments, to Rotary Oil Tool Company, Buena Park, Calif., a corporation of California
Filed Aug. 14, 1967, Ser. No. 660,297
Int. Cl. E02d 27/40, 27/48
U.S. Cl. 61—33                                         18 Claims

ABSTRACT OF THE DISCLOSURE

A method of and apparatus for anchoring and tensioning reinforcing steel tendons in boreholes traversing dam structures and the subsurface earth formation, and filling the holes with cement aggregate while the tendons are under tension.

---

The present invention relates to anchoring and tensioning elongate reinforcing elements in drilled boreholes, which are to be cemented in place while under tension.

Frequently, it is desirable and necessary to install elongate reinforcing elements in drilled holes extending through earth formation or through super-structures upon the earth and into the subsurface earth formation, in which the reinforcing elements are to be cemented by the use of a pumpable cement slurry or aggregate. The present invention involves a method and apparatus whereby such elongate metallic reinforcing elements may be preliminarily placed under substantial tension and held under tension as the cement is placed in the hole so as to enhance the strength of the resultant structure.

An example of the application of the present method and apparatus would be the cementing of well bore liners or casings with a well bore while the liner or casing is under tension. Another specific example, which will be hereinafter described in greater detail, involves the installation of reinforcing tendons in drilled holes traversing a concrete dam and the underlying subsurface earth or rock formations.

From time to time, it is desirable that concrete dams be reinforced so as to correct inherent weakness or to enhance its capacity. It has been the practice to drill holes downwardly through the concrete dam into the subsurface earth or rock formation, and to then cement within the rock formation a series of elongate tendons or steel bars which extend to the top of the drilled hole. After the tendons have been anchored in the rock formation by the setting of the cement composition over a period of weeks, they are tensioned and the remainder of the drilled hole filled with cement to create a unitized structure. Such operations are not altogether satisfactory since there is substantial time loss, as well as other disadvantages, which attend the anchoring of the steel tendons in the subsurface rock in one operation, followed by the tensioning of the tendons and filling of the drilled hole with cement as later and separate operations.

Accordingly, an object of the present invention is to provide a method of and apparatus for anchoring steel elements or tendons in a drilled hole and applying tension thereto, and while the elements or tendons are under tension, filling the hole with cement, thereby eliminating the delay which inherently occurs in the prior methods and in the use of the prior apparatus. The present method and apparatus, moreover, eliminate the repeated movement of equipment to the site of the respective drilled holes to perform the various operations at different times, and, instead, provide for the successive completion of all operations at each drilled hole in a concrete dam, which may contain a substantial number of such holes all adapted to have reinforcing tendons cemented in place.

Another object of the invention is to provide a method of and apparatus for installing tendons in drilled holes traversing dam structures and subsurface earth formations, wherein the tendons are connected to an anchor mechanism at the lower extremities of the tendons, which anchoring mechanism is adapted to be engaged with the subsurface rock formation as the tendons are subjected to tension forces, the tensions forces being maintained on the tendons as the cement slurry is placed in the drilled hole in surrounding relation to the anchor and to the tendons. The tendons, moreover, are retained in tensioned condition as the cement is allowed to cure, following removal of all of the necessary equipment from the site of the hole, so that such equipment can be used in the placement, tensioning, and cementing of tendons in another hole in the same or in another dam structure.

Still another object of the invention is to provide for use in the running, tensioning, and cementing of tendons in drilled holes of a top plate or head assembly to which the upper ends of the tendons are rigidly secured, said top plate or head assembly including means for connection thereto of a conduit for the cement ultimately to be displaced into the hole, as well as providing means for connection thereto of a hoist mechanism whereby the assembly may be run into the drilled hole and initially tensioned, the top plate or head assembly further including means for connection thereto of an adapter which enables the use of blocks beneath the plate assembly to support the tendons in various stages of tension, and which, further, facilitate the connection of jack mechanisms to the top plate or head assembly whereby the tendons may be tensioned.

Yet another object of the invention is to provide a subsurface anchor mechanism useful in the anchoring of tendons in drilled holes as aforesaid, which anchor mechanism is of simple construction, and is durable and susceptible of sustaining extreme tension forces applied to the tendons, which tension forces cause anchoring engagement of the anchor with the subsurface rock formation.

This invention possesses many other advantages and has other objects which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings:

FIG. 4 is a view illustrating, in side elevation, a top plate or head and anchor assembly, with tendons and a cement pipe extending therebetween;

FIG. 5 is a transverse sectional view, on an enlarged scale, as taken on the line 5—5 of FIG. 4;

FIG. 6 is a transverse sectional view, on an enlarged scale, as taken on the line 6—6 of FIG. 4, with a portion broken away;

FIG. 7 is a view in longitudinal section through the assembly of FIG. 4;

FIG. 8 is a view in longitudinal section illustrating the top plate or head assembly and interconnected elevator, and also disclosing the anchor mechanism run into the enlarged section of the hole, the anchor being conditioned for subsequent anchoring engagement with the wall of the hole;

FIG. 9 is a fragmentary view in longitudinal section illustrating the anchor assembly in initial anchoring engagement with the wall of the hole in response to initial elevation of the elevator;

FIG. 10 illustrates the top plate or head assembly supported on blocks, following elevation thereof, and showing the anchor assembly in anchoring engagement with the wall of the drilled hole responsive to such elevation of the top plate assembly;

FIG. 11 is a vertical sectional view illustrating a hydraulic jack mechanism applied to the top plate or head assembly for jacking the same upwardly to tension the tendons and cause further anchoring engagement of the anchor assembly with the wall of the drilled hole;

Figure 1:
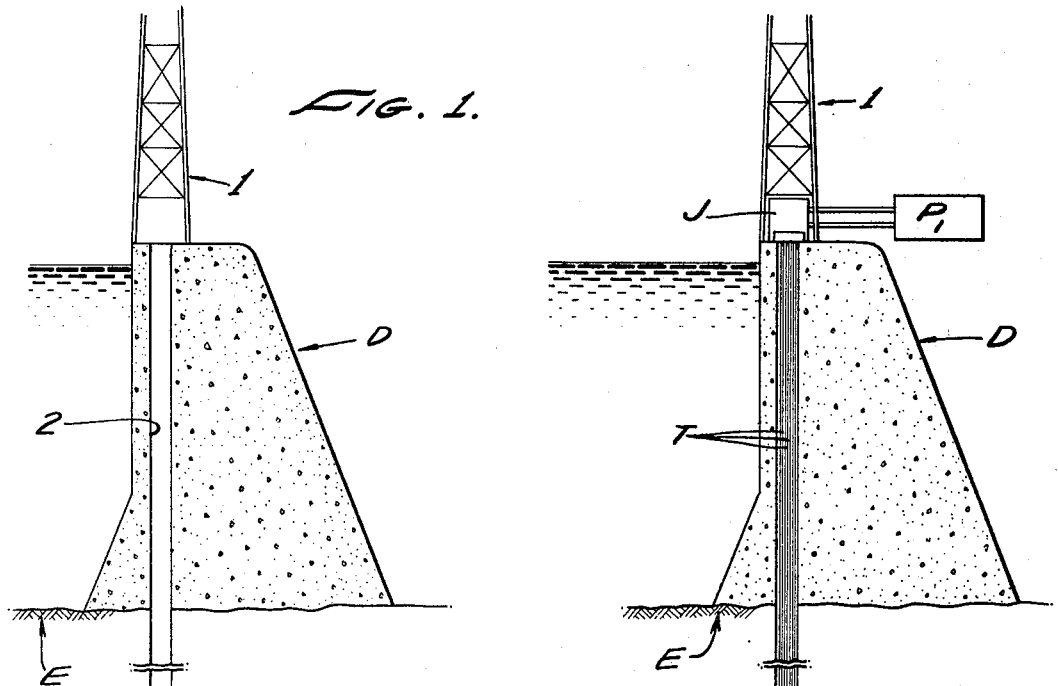
FIGURE 1 is a diagrammatic view illustrating a concrete dam having a borehole drilled therethrough and into the subsurface earth and rock formation, in which formation the drilled hole has been enlarged in accordance with the method hereof, preparatory to the anchoring, tensioning and cementing of reinforcing tendons therein.

FIG. 12 illustrates the top plate or head assembly supported in tendon tensioning position and the anchor assembly in fully anchored engagement with the well wall, a cement aggregate having been displaced downwardly through the conductor pipe and filling the drilled hole in surrounding relation to the tendons and the pipe; and FIG. 13 is an enlarged transverse sectional view as taken on the line 13—13 of FIG. 12.

As illustrated in the drawings, the method and apparatus of the invention are useful in the reinforcing of a dam D based upon a subsurface earth formation E including a subjacent strata of rock R. As a step in the method hereof, a drilling rig 1 is located at the top of the dam and a drilling operation is performed to drill a hole 2 downwardly through the dam D and into the earth formation E and the rock R. Within the rock R the drilled hole 2 is underreamed or enlarged as at 3 by means of suitable and well known underreaming equipment, such underreaming providing a downwardly facing shoulder 4 in the drilled hole.

Figure 2:
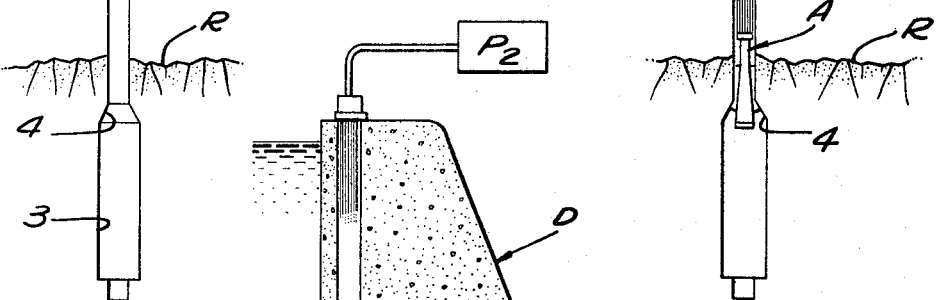
FIG. 2 is a view generally corresponding to FIG. 1, but showing the reinforcing tendons anchored in the drilled hole and tensioned by a hydraulic jack mechanism in accordance with the method hereof.

Referring to FIG. 2, there is illustrated an intermediate stage in the practice of the method, wherein a plurality of elongate, circumferentially spaced steel rods or "tendons" T have been tensioned within the hole 2 between an anchor assembly A, anchored against the shoulder 4 of the hole, and also within the lower portion of the smaller diameter section 2 of the drilled hole, and a jack assembly J which is illustrated as being of the hydraulically operated type.

Figure 3:
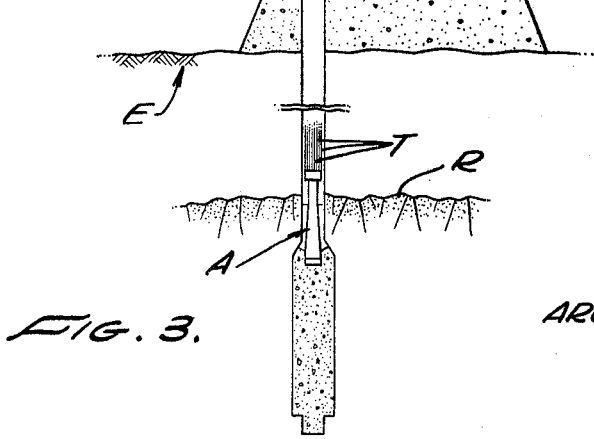
FIG. 3 is a view generally corresponding to FIGS. 1 and 2, but illustrating the tensioned tendons cemented in place within the drilled hole.

In FIG. 3, the tensioned tendons T are disclosed as being supported by a top plate or head assembly, hereinafter to be more fully described, while a pumpable cement aggregate or slurry is displaced downwardly trough the top plate and through the anchor so as to fill the hole, including the underreamed section 3 thereof, with the cement slurry, such cement being displaced by a usual cement pump P2. Following displacement of the fluent cement, the pump P2 may be disconnected and moved successively to other drilled holes in which there have previously been installed the apparatus generally described above in the performance of the method of the present invention. Thus, it will be apparent that the apparatus generally referred to above is movable from hole to hole in succession along the dam D so as to progressively cement in place pretensioned tendons T, so that when the cement slurry has cured, the dam will be reinforced.

More specifically, the method and the apparatus for its practice will be understood upon reference to the detailed illustration of the apparatus in its various stages of operation. In FIG. 7 is illustrated a top plate 5 forming a part of the head assembly, from which a tubular conduit 6 extends upwardly having an outwardly extended flange or shoulder 7 at its upper end for engagement by an elevator body 8 provided with a bail 9. The conduit 6 is threadedly connected at 10 to the plate 5 in communication with a central opening 11 therethrough, and extending downwardly from the top plate 5 is a tubular conduit or pipe 12 which is threadedly connected, as at 13, or otherwise suitably joined, with the top plate 5. Depending from the top plate 5 are the tendons T previously referred to, which, as illustrated, are connected to the top plate at the upper extremities of the tendons, the tendons extending through holes 14 in the plate 5 and being peened over and welded, or otherwise suitably affixed, to the top plate, as at 15. The tendons and the central conductor or pipe 12 are adapted to extend downwardly a desired distance so that they will traverse the depth of the drilled hole 2, for the purpose of disposing the anchor A in the enlargement 3, at the bottom of the hole.

The anchor A includes an elongate mandrel or body 16 having a threaded cup-like head 17 at its upper end adapted to threadedly receive a tendon connector 18, this connector having an outwardly extended flange 19. The lower portions of the tendons T are suitably secured to the connector and its flange 19, for example, as by peening over the terminals of the tendons T and welding, or otherwise suitably affixing, the tendons to the connector 18. The connector 18 also includes a central passageway 20 which communicates with the lower end of the central conductor or pipe 12, the latter being threadedly, or otherwise suitably, secured as at 21 to the connector 18.

The anchor mandrel 16 beneath the cup-like head 17 includes an upper cylindrical body section 22 on which is slidably disposed a ring 23. Depending from the ring 23 is a series of circumferentially spaced resilient arms 24 which extend downwardly along the upper body section 22 of the mandrel 16, and which are provided at their lower extremities with rigid hole wall engaging anchor elements or slips 25. These anchor elements or slips 25 are slidably disposed upon an intermediate and reduced mandrel or body section 26. The lower end section 27 of each anchor element is internally tapered or diverges downwardly and engages a lower expander section 28 of the mandrel 16 which tapers upwardly, and is of generally frusto-conical form. At their lower extremities, the anchor slips 25 are provided with outstanding lugs 29 providing upwardly facing shoulders 30. Beneath the lugs 29 are ears 31 extending downwardly and confined inwardly by means adapted to be disrupted so as to allow outward expansion of the arms and slips when such expansion is desired.

The confining means comprises an expansible band or strap 32 which extends circumferentially about the depending ears 31 of the anchor slips 25, with the ends of the bands overlapping each other. The band 32 and the expandible spring arms 24 are normally retained against outward movement by a tie wire 33 extending transversely of the expander or cone section 28 of the mandrel 16 through radial holes 33a, the ends of the tie wire being secured to bolts 34 extending into the holes 33a and aligned holes 33b in the band and a pair of diametrically opposed ears. One of the bolts may extend through the overlapping ends of the band. These pins 34 also serve as a means for maintaining the slips and mandrel in a fixed relationship axially, so that the anchor means may be run into the hole 2 to the enlarged portion 3.

It will be noted that the mandrel 16 has a through passage 35 extended longitudinally thereof, into which the bores 33a open, and communicating with the passage 20 in the connector 18. A suitable tool, such as a go-devil 36, may be dropped through the top plate 5, falling through the central conductor pipe 12 and through the passage 35 in the mandrel 16 into engagement with the tie wire 33 to sever or break the same, allowing the band 32 to expand inherently outwardly from the ears 31, the band pulling the bolts 34 out of the holes 33b to release the anchor slips 25 for outward expansion and permitting relative longitudinal movement of the mandrel 16 relative to the slips.

Ordinarily, the anchor lugs 29 on the slips 25, when confined by the band 32 and the tie wire 33, will have an outward projection not exceeding the outward projection of the lower extremity of the expander cone section 28 of the mandrel 16. The pins 34 secured to the tie wire 33 will normally support the anchor slips 25 in an upper position relative to the mandrel 16. However, it will be noted in FIG. 8 that upon severing of the tie wire 33 by the go-devil 36, the anchor slip assembly, including its ring 23, is free to drop downwardly relative to the mandrel 16 until the ring 23 comes to rest upon a suitable frangible stop means, which may be constituted as shear pins 37 carried by the upper mandrel section 22.

It will now be apparent that the apparatus, as thus far specifically described, comprising the top plate 5, its supporting pipe 6, elevator 8, and bail 9, may be lowered into the drilled and underreamed hole by suitable hoist mechanism (not shown) in the derrick 1. As shown in FIG. 8, when the anchor mechanism A is disposed in the underreamed or enlarged hole section 3 beneath the downwardly facing shoulder 4 thereof, the go-devil 36 may be dropped through the pipe 6 and the passage 35 to break the wire 33 and release the anchor elements of the anchor mechanism. When the anchor slips 25 expand outwardly, due to the normal outward expansive force of the spring arms 24, the lugs 29 will be expanded to a diameter larger than the smaller diameter section of the hole 2, being engageable with the downwardly facing shoulder 4 formed in the underreaming of the hole. Thereupon, when the hoist mechanism raises the assembly within the drilled hole, the lugs 29 will, as shown in FIG. 9, be brought into engagement with the shoulder 4 of the underreamed hole so as to prevent further upward movement of the anchor slips 25, even though the hoist mechanism may raise the anchor mandrel 16 to a further extent.

In accordance with the methods hereof, the upward movement of the anchor mandrel 16 will tension the tendons T, and at the same time effect further anchoring of the anchor assembly against the well wall. As shown in FIG. 10, the hoist mechanism is adapted to raise the elevator 8 to the point that the top plate 5 may be threadedly engaged within an adapter 5a through which, as shown in FIG. 8, the assembly has been initially lowered. When the top plate 5 is engaged within the adapter 5a, the latter may be threadedly adjusted into abutting engagement with support blocks 40 resting on top of the dam D, which may be in the form of a split ring, so as to maintain the tendons T under the tension applied thereto by the hoist mechanism. That is to say, depending upon the nature of the rock formation and the force available for elevating the elevator 8, the top plate 5 may be moved upwardly above the top surface of the dam D to a greater or lesser extent, and the adapter 5a, being threadedly connected to the top plate 5, may be adjusted vertically to abut the block means 40, so as to maintain the tendons in the pretension condition.

During the pretensioning of the tendons T, and as best seen in FIG. 10, the anchor mandrel 16 will be elevated relative to the anchor sections or slips 25, which are held against further upward movement by the lugs 29 engaging the downwardly facing shoulder 4 of the underreamed hole. Accordingly, the shear pins 37 will be sheared as the mandrel 16 moves upwardly and the conical expander section 28 of the mandrel 16 will move further upwardly within the anchor slip elements 25, deflecting and forcing the same outwardly into tight preliminary anchoring engagement with the side wall of the rock R, the anchor assembly being held in such preliminary anchored condition by the adapter 5a and the support block or blocks 40. With the tendons T pretensioned and the anchor held in anchored condition by the blocks 40, the conduit 6 may be unscrewed and removed from the top plate 5, as is shown in FIG. 10, thus clearing the way for the further method steps.

In accordance with the method hereof, the tendons T are adapted to be further tensioned by the application of a greater elevating force to the top plate 5. Referring to FIG. 11, there is illustrated a typical means whereby such further tension may be applied to the tendons T. A hydraulic jack assembly, as previously referred to and generally designated J, includes a support structure 41 adapted to straddle the top plate 5 and adapter 5a, while the latter is supported upon the support blocks 40, the support structure 41 having side openings 42 allowing removal of the support blocks 40 when desired, and the insertion in place of the blocks 40 of further blocks as will more fully appear hereinafter.

Formed as a part of, or suitably combined with, the support structure 41 is a hydraulic jack cylinder 43 having a chamber 44 therein. Reciprocable within the chamber 44 is a piston 45 secured to a rod 46 extending through a cylinder end wall 47 and connected to a cup-like connector member 48 which is internally threaded, as at 49, for threaded engagement with the adapter 5a. With the connector 48 connected to the adapter 5a, fluid under pressure may be admitted to the chamber 44 below the piston 45 through a supply conduit 50 leading from the pump P1 (FIG. 2), previously referred to, the return to the pump from the chamber above the piston 45 being through a conduit 51.

It will now be understood that the application of fluid pressure below the piston 45 will cause elevation of the top plate 5 and further tensioning of the tendons T. Such further tensioning of the tendons T will cause further upward movement of the expander 28, accompanied by additional outward expansion of the slips 25 and greater anchoring engagement of the anchor assembly A with the wall of the hole 2 in the rock R.

In addition, when the tendons T are in the further tensioned condition pursuant to operation of the hydraulic jack J, the side openings 42 in the support structure 41, as previously indicated, afford access for removal of the support blocks 40 which previously maintained the tendons in a pretensioned condition, the blocks 40 being free of load because of elevation of the adapter 5a and top plate 5 by the jack. Taller support blocks 52 may be placed beneath the adapter 5a, a seen in FIG. 12, which may advantageously be in the form of split ring segments, as seen in FIG. 13, so that the tendons T may be retained in their fully tensioned condition.

Referring now to FIG. 12, the anchor assembly A is shown in full anchoring engagement with the rock formation R as a result of actuation of the jack J. It will be noted in this connection that the anchor slip segments 25 have been deformed laterally outward into the rock R by the upward movement of the expander cone section 28 of the mandrel 16 during operation of the jack J, and that the anchor lugs 29 at the lower end of the slip elements 25 are firmly embedded in the rock R, which is now subjected to substantial compression by the slip elements 25 so as to enhance the holding capacity of the rock R and firmly anchor the tendons T in tensioned condition.

As the next step in the method of the present invention, it is desired that the drilled hole 2 and the underreamed section 3 thereof be filled with cement aggregate. Accordingly, the hydraulic jack J is removed by unthreading the connector member 48 from the adapter 5a, and a cement supply conduit 53 is connected to the top plate 5, as seen in FIGS. 3 and 12, such conduit 53 leading from a cement pump P2, as previously referred to. The cement pump P2 is adapated to displace, in a well-known manner, a quantity of cement slurry downwardly through the central conductor or pipe 12, and then downwardly through the passage 35 in the anchor mandrel 16, the latter being, if desired, provided with a suitable number of lateral ports 35a leading from the central passage 35 into the drilled hole 2, while the central passage 35 opens at its lower end into the enlarged underreamed hole section 3. The enlarged hole 3 and the hole 2 throughout its length may be filled with cement, which passes upwardly through the annular space surrounding the central pipe or conduit 12 in which the tendons T are disposed, so that cement surrounds all of the tendons as well as the central pipe. When the cement slurry overflows at the top of the dam, it is known that the hole has been filled.

Thereafter, the pump P2 and conduit 53 may be disconnected from the adapter 5a and moved to the next hole, which previously had its tendons T prestressed and supported therein preliminary to the displacement of cement into the hole.

Thus, the holes 2 may be drilled at spaced intervals along the dam, then enlarged at their lower portions, all of the anchor assemblies run in the holes and anchored therein with their tendons in the desired stress condition, followed by successive cementing of the downhole apparatus in each of the hole to permanently anchor them in place in their greatly stressed condition imposing a downward holding force on the dam D.

From the foregoing, it will now be apparent that the present invention provides an appartus and a novel method of use of the appartus whereby reinforcing elements adapted to extend longitudinally in a drilled hole may be prestressed and held under a prestressed or tensioned condition during the cementing of the reinforcing element or elements in place. As a consequence, in the illustrative embodiment, the dam D will be adequately reinforced so as to enlarge its capacity, and the usual waiting time during which the cement is curing in accordance with previous modes of dam reinforcement has been fully avoided. In addition, the anchor structure is such that substantial tension forces may be applied to the tendons and the anchor, inasmuch as it applies a compressive load on the rock which will enable greater tension forces to be applied than have been applicable heretofore in the case of the precementing of the lower end of the tendons in the bottom of the drilled hole.

I claim:

1. In the method of installing elongated reinforcing means in drilled holes extending into the earth, the steps of: underreaming the hole to form a downwardly facing shoulder therein, lowering said reinforcing means into said hole, expanding the lower portion of said reinforcing means outwardly to a position underlying said shoulder, then elevating said reinforcing means to engage said expanded lower portion with said shoulder to anchor the lower portion of said reinforcing means on said shoulder against upward movement in said hole, tensioning said reinforcing means, and then filling said hole with cementitious material while retaining said reinforcing means comprises a pipe through which said cementitious said lower portion of said reinforcing means therein.

2. The method of claim 1, including loading the earth in compression above said shoulder during said anchoring of the lower end of said reinforcing means on said shoulder.

3. The method of claim 1, wherein said reinforcing means comprises a plurality of tendons circumferentially spaced in said hole, and said cementitious material surrounds said tendons.

4. The method of claim 1, wherein said reinforcing means comprises a pipe through which said comentitious material is pumped to fill said hole, and said cementitious material surrounds said pipe.

5. Apparatus as defined in claim 18, and said anchor having means for initially preventing expansion of said slip sections.

6. Apparatus as defined in claim 18, and said anchor having means for initially preventing expansion of said slip sections including tie means holding said slip sections and expander in fixed relation.

7. In apparatus for reinforcing dam structures through which a hole has been drilled into the subsurface earth, an assembly comprising: an elongate plurality of reinforcing tendons, anchor means at one end of said assembly, a head at the other end of said assembly, said anchor means and said head being connected to said tendons, said anchor means including anchor elements movable into anchoring engagement with the wall of said hole in said subsurface earth in response to upward movement of said head to anchor the lower ends of said tendons in said hole, wherein said anchor elements comprise a series of circumferentially spaced arms having anchor slip sections, said anchor means also including an expander for expanding said slip sections outwardly upon relative longitudinal movement of said expander and said slip sections, and said anchor having means for initially preventing expansion of said slip sections including tie means holding said slip sections and expander in fixed relation, said tie means having a tie wire extending through said anchor and severable by cutter means dropped through said anchor.

8. Apparatus as defined in claim 18, and frangible means for causing movement of said slip sections and said expander as a unit to effect engagement of said lugs with said wall of said hole and thereafter disruptible to enable movement of said expander relative to said slip sections.

9. Apparatus as defined in claim 18, wherein a pipe extends between said anchor means and said head, said head and anchor means having passages communicating with said pipe for conducting cementitious material into said hole.

10. Apparatus as defined in claim 18, wherein said head includes a member connected to said tendons, and adapter means removably connectible to said member for enagagement with supporting means at the top of the hole and dam structure.

11. Apparatus as defined in claim 18, wherein said head includes a member having a passage therein for the passage of cementitious material into said hole, said member having means for removably connecting the same to a hoist.

12. Apparatus as defined in claim 18, wherein said head includes a member having a passage therein for the passaage of cementitious material into said hole, said member having means for removably connecting the same to a hoist, and an adapter on said member having means for removably connecting said head to a jack.

13. The method of claim 1, and also anchoring the lower portion of said reinforcing means against the wall of said hole above said shoulder prior to filling of said hole with cementitious material.

14. In the method of reinforcing a dam structure by installing reinforcing tendons in holes drilled from the upper end of said structure downwardly through said dam structure into the subsurface earth, the steps of: underreaming a hole in the subsurface earth to form a downwardly facing shoulder, affixing an anchor to tendons and lowering said anchor and tendons in the hole to locate said anchor in the underreamed portion of said hole, expanding said anchor outwardly to a position underlying said shoulder, then applying an upward pull on said tendons to engage said expanded anchor with said shoulder and thereby anchor the lower portions of said tendons against said shoulder, affixing the upper portions of said tendons to the upper end of said dam structure to maintain the upward pull on said tendons and also to apply a downward force on said dam structure, and then filling said hole and its underreamed portion with cementitious material with the upward pull retained on said tendons.

15. The method of claim 14, and also anchoring said anchor against the wall of said hole above said shoulder prior to filling of said hole with cementitious material.

16. The method of claim 14, wherein said tendons and gate plurality of reinforcing tendons, anchor means at anchor are lowered in said hole by a hoist, and said upward pull is applied to said tendons and anchor by said hoist to secure said anchor against said shoulder, and including blocking up the upper ends of said tendons at the top of the dam structure to maintain said upward pull on said tendons, disconnecting said hoist from said tendons while said tendons are blocked up, and before filling said hole with cementitious material jacking up the upper ends of said tendons to tension said tendons and more securely engage said anchor with said shoulder, and again blocking up the upper ends of said tendons to retain the jacked up tension in said tendons.

17. The method of reinforcing a dam structure, comprising: drilling a hole downwardly through said dam structure and into the subsurface earth, underreaming said hole to form a downwardly facing shoulder in the hole in the subsurface earth, lowering into said hole a number of tendons having an anchor assembly at the lower ends thereof and a plate at the upper ends thereof, anchoring said anchor assembly against said shoulder by applying an upward pull on said plate, jacking up said plate to tension said tendons, and then filling said hole with cementitious material while said tendons are held under tension, said cementitious material embedding said anchor assembly therein, jacking up of said plate also anchoring said anchor to the wall of the hole above said shoulder.

18. In apparatus for reinforcing dam structures through which a hole has been drilled into the subsurface earth, which hole has been underreamed to form a downwardly facing shoulder, an assembly comprising: an elongated anchor means at one end of said assembly, a head at the other end of said assembly, said anchor means and said head being connected to said tendons; said anchor means including anchor elements comprising a series of circumferentially spaced arms having anchor slip sections, said anchor means also including an expander for expanding said slip sections outwardly in engagement with the wall of the hole above said shoulder upon relative longitudinal movement of said expander and said slip sections, said slip sections having lugs engageable with the shoulder of said hole to hold said slip sections against longitudinal movement with said expander.

References Cited

UNITED STATES PATENTS

| | | | |
|---|---|---|---|
| 1,896,810 | 2/1933 | Coyne | 61—30 |
| 2,373,319 | 4/1945 | Long | 61—53.58 |
| 3,087,308 | 4/1963 | Hart et al. | 61—50 X |
| 3,200,599 | 8/1965 | Phares et al. | 61—63 X |
| 3,226,933 | 1/1966 | White | 61—39 |
| 3,299,644 | 1/1967 | White | 61—49 X |
| 3,309,878 | 3/1967 | Lamberton | 61—53.62 |
| 3,324,666 | 6/1967 | Lee | 61—53.68 |

FOREIGN PATENTS

| | | |
|---|---|---|
| 1,375,895 | 9/1964 | France. |
| 965,848 | 6/1957 | Germany. |

PETER M. CAUN, Primary Examiner

PO-1050
(5/69)

UNITED STATES PATENT OFFICE
CERTIFICATE OF CORRECTION

Patent No. 3,503,213          Dated March 31, 1970

Inventor(s) ARCHER W. KAMMERER, JR.

It is certified that error appears in the above-identified patent and that said Letters Patent are hereby corrected as shown below:

Column 7, line 55, after "means" insert --under tension,--; line 55, cancel "comprises a pipe through which"; line 55, after "cementitious" insert --material embedding--.

Column 9, line 1, cancel "gate plurality of reinforcing tendons, anchor means at".

Column 10, line 2, before "one" insert --gate plurality of reinforcing tendons, anchor means at--.

Signed and sealed this 21st day of March 1972.

(SEAL)
Attest:

EDWARD M. FLETCHER, JR.          ROBERT GOTTSCHALK
Attesting Officer                Commissioner of Patents